US011060003B2

(12) United States Patent
Maier et al.

(10) Patent No.: US 11,060,003 B2
(45) Date of Patent: Jul. 13, 2021

(54) WATER-BASED COMPOSITION WITH LOW SURFACE TACKINESS

(71) Applicant: SIKA TECHNOLOGY AG, Baar (CH)

(72) Inventors: Steffen Maier, Wettingen (CH); Ukiwo Onuoha, Bassersdorf (CH)

(73) Assignee: SIKA TECHNOLOGY AG, Baar (CH)

( * ) Notice: Subject to any disclaimer, the term of this patent is extended or adjusted under 35 U.S.C. 154(b) by 165 days.

(21) Appl. No.: 16/348,965

(22) PCT Filed: Dec. 5, 2017

(86) PCT No.: PCT/EP2017/081513
§ 371 (c)(1),
(2) Date: May 10, 2019

(87) PCT Pub. No.: WO2018/108629
PCT Pub. Date: Jun. 21, 2018

(65) Prior Publication Data
US 2019/0292424 A1 Sep. 26, 2019

(30) Foreign Application Priority Data
Dec. 12, 2016 (EP) .................................. 16203553

(51) Int. Cl.
| | | |
|---|---|---|
| C09J 133/04 | (2006.01) | |
| C09D 7/63 | (2018.01) | |
| C09D 133/04 | (2006.01) | |
| C09J 5/00 | (2006.01) | |
| C09J 11/06 | (2006.01) | |
| C09D 133/08 | (2006.01) | |
| C09J 133/08 | (2006.01) | |
| C08K 5/12 | (2006.01) | |

(52) U.S. Cl.
CPC .............. *C09J 133/04* (2013.01); *C09D 7/63* (2018.01); *C09D 133/04* (2013.01); *C09D 133/08* (2013.01); *C09J 5/00* (2013.01); *C09J 11/06* (2013.01); *C09J 133/08* (2013.01); C08K 5/12 (2013.01); C08K 2201/014 (2013.01); C08L 2666/06 (2013.01); *C09J 2423/00* (2013.01); *C09J 2433/00* (2013.01)

(58) Field of Classification Search
CPC ...................................................... C09J 133/04
See application file for complete search history.

(56) References Cited

U.S. PATENT DOCUMENTS

| | | | | |
|---|---|---|---|---|
| 5,442,001 A | * | 8/1995 | Jones ....................... | C09J 11/06 427/208.8 |
| 2003/0013801 A1 | * | 1/2003 | Sieber ..................... | C08L 23/00 524/560 |

FOREIGN PATENT DOCUMENTS

| | | |
|---|---|---|
| CA | 2 396 949 A1 | 7/2001 |
| DE | 19801892 A1 | 7/1999 |
| EP | 0 490 191 A2 | 6/1992 |
| EP | 0 620 243 A1 | 10/1994 |
| EP | 0 643 115 A2 | 3/1995 |
| EP | 1 629 865 A1 | 3/2006 |
| WO | 01/51582 A1 | 7/2001 |
| WO | 2015185642 A1 | 12/2015 |

OTHER PUBLICATIONS

With n-paraffin solvent Safety Data Sheet, Millipore Sigma, Dec. 17, 2020. (Year: 2020).*
ICP solvent Safety Data Sheet, Millipore Sigma, Nov. 20, 2020. (Year: 2020).*
Ash, M. Handbook of Green Chemicals, 2nd ed.; Synapse Info Resources: New York, 2004; pp. 12. (Year: 2004).*
Feb. 19, 2018 International Search Report issued in International Patent Application No. PCT/EP2017/081513.
Feb. 19, 2018 Written Opinion of the International Searching Authority issued in International Patent Application No. PCT/EP2017/081513.

\* cited by examiner

*Primary Examiner* — Michael F Pepitone
(74) *Attorney, Agent, or Firm* — Oliff PLC

(57) ABSTRACT

A water-based dispersion sealant composition, including an aqueous polymer dispersion including water and at least one water-dispersible polymer, at least one polyolefin oligomer, at least one hydrogenated mixture of alkanes, isoalkanes, and/or cycloalkanes with a boiling point of at least 150° C., and optionally at least one plasticizer having at least one ester or ether group, wherein the at least one polyolefin oligomer and the at least one hydrogenated mixture of alkanes, isoalkanes, and/or cycloalkanes with a boiling point of at least 150° C. are liquid at 23° C. and under standard pressure, wherein the at least one polyolefin oligomer is selected from polybutene and/or polyisobutylene, and wherein said at least one water-dispersible polymer is selected from poly(meth)acrylate polymers, styrene-(meth) acrylate copolymers, and vinyl-acetate-(meth)acrylate copolymers. The inventive composition is highly suitable as joint sealant or coating and offers reduced surface tackiness, low modulus, also at low temperatures, and good adhesion and water-resistance properties.

13 Claims, No Drawings

WATER-BASED COMPOSITION WITH LOW SURFACE TACKINESS

CROSS-REFERENCE TO RELATED APPLICATIONS

This is a National Stage Entry of PCT/EP2017/081513, filed Dec. 5, 2017 which claims the priority to EP 16203553.9 filed Dec. 12, 2016. The disclosure of each of the prior applications is hereby incorporated by reference herein in its entirety.

TECHNICAL FIELD

The invention relates to aqueous dispersion sealants and use thereof for sealing joints or coating surfaces.

BACKGROUND OF THE INVENTION

Dispersion sealants based on aqueous dispersions of polymers are commonly used in the construction industry for sealing joints or coating surfaces to form a protective layer or to seal joints or surfaces against water and other ambient influences.

Compared to solvent-based sealants, water-based sealants mainly have the advantage that they do not emit as many volatile organic compounds (VOC) which are hazardous to health and the environment. Furthermore, they have generally a lower odor and are thus more consumer-friendly and suitable for indoor applications. Their curing or rather hardening mechanism to form a durable, elastic sealant material mainly involves drying of substantial parts of the water contained in the dispersion and increasing physical interactions between the polymers contained therein with decreasing water content.

For joint sealants, it is advantageous that the sealant compositions after drying have a low Shore A hardness and exhibit high flexibility with a low modulus and good adhesion to their substrate, even at low temperatures below zero ° C. However, such soft water-based sealants have inevitably a more or less tacky surface, which is associated with the low glass-transition temperature $T_g$ of the polymers contained therein and/or the usually high amounts of plasticizer required to obtain the above-mentioned mechanical properties. This effect is disadvantageous, because dirt and dust can adhere to the tacky surface, especially on construction sites when the applied sealant is still fresh and not completely dried. Silicone oils have been used as additives to overcome this problem, but they often have negative results on the adhesion performance, because they also assemble at the interface between the sealant and the substrate. Furthermore, silicones tend to impart a decreased paintability of the sealant after drying.

WO 01/51582 A1 describes a single component sealant which is based on a dispersion of vinyl polymers that is suitable for joining polyolefin materials. However, in its dry state, the sealant is self-adherent and thus has a tacky surface.

It is thus desirable to obtain a water-based sealant composition which does not have the above-mentioned disadvantages.

SUMMARY OF THE INVENTION

The object of the present invention is to provide a soft, water-based dispersion sealant composition having low surface tackiness, low modulus, also at low temperatures, and good adhesion and water-resistance properties.

The sealant is especially suitable for sealing joints or surfaces, but may also be employed as low modulus elastic adhesive.

Surprisingly, it has been found that adding a combination of at least one polyolefin oligomer and at least one hydrogenated mixture of alkanes, isoalkanes, and/or cycloalkanes with a boiling point of at least 150° C. to the sealant composition does not only lead to a desired extremely low surface tackiness and low modulus, but also improves mechanical properties and water resistance properties of the sealant significantly without negatively affecting the adhesion properties.

According to another aspect of the present invention, a method for sealing a joint or coating a surface is provided.

DETAILED DESCRIPTION OF THE INVENTION

Substance names beginning with "poly" designate substances which formally contain, per molecule, two or more of the functional groups occurring in their names. For instance, a polyol refers to a compound having at least two hydroxyl groups. A polyether refers to a compound having at least two ether groups.

The term "polymer" in the present document encompasses on the one hand a collective of chemically uniform macromolecules which nevertheless differ in respect of degree of polymerization, molar mass, and chain length, which collective has been prepared through a polymerization reaction (chain growth addition polymerization, free radical polymerization, polyaddition, polycondensation). On the other hand the term also encompasses derivatives of such a collective of macromolecules from polymerization reactions, in other words compounds which have been obtained by reactions, such as additions or substitutions, for example, of functional groups on existing macromolecules and which may be chemically uniform or chemically non-uniform.

"Molecular weight" of oligomers or polymers is understood in the present document to be the molecular weight average $M_n$ (number average), which is typically determined by means of GPC against polystyrene as standard.

The unit term "wt.-%" means percentage by weight, based on the weight of the respective total composition, if not otherwise specified. The terms "weight" and "mass" are used interchangeably throughout this document.

All industrial norms and standard methods mentioned in this document are referring to the respective current versions at the time of filing.

The term "(meth)acrylic" designates methacrylic or acrylic. Accordingly, the term "(meth)acrylate" designates methacrylate or acrylate.

The term "polyacrylate polymer" designates polymers resulting from the free-radical polymerization of two or more (meth)acrylate monomers. Copolymers of the (meth)acrylate monomers and copolymers of (meth)acrylate monomers with other vinyl group containing monomers are also included within the term "polyacrylate polymer". The terms "polyacrylate polymer", "polyacrylate" and "acrylate polymer" are used interchangeably.

The term "shelf life" designates a time period after which a dispersion adhesive composition has substantially coagulated, separated or settled such that it cannot be readily applied to a surface of a substrate as homogeneous, uniform film or bead.

The term "storage stable composition" designates a composition, which has a shelf life of greater than six months when stored at room temperature and at a relative humidity (abbreviated "r.h.") of 50% when stored in a closed container. The term "room temperature" (abbreviated "RT") designates a temperature of 23° C.

The term "standard pressure" designates an absolute pressure of 1 bar.

The present invention relates in a first aspect of the invention to a water-based dispersion sealant composition comprising:
a) an aqueous polymer dispersion comprising water and at least one water-dispersible polymer P,
b) at least one polyolefin oligomer PIB,
c) at least one hydrogenated mixture ALK of alkanes, isoalkanes, and/or cycloalkanes with a boiling point of at least 150° C., and
d) optionally at least one plasticizer PL having at least one ester or ether group, wherein the at least one polyolefin oligomer PIB and the at least one hydrogenated mixture ALK of alkanes, isoalkanes, and/or cycloalkanes with a boiling point of at least 150° C. are liquid at 23° C. and under standard pressure, and wherein the at least one polyolefin oligomer PIB is selected from polybutene and/or polyisobutylene, and
wherein said at least one water-dispersible polymer P is selected from poly(meth)acrylate polymers, styrene-(meth) acrylate copolymers, and vinyl-acetate-(meth)acrylate copolymers.

The term "dispersion" refers to a physical state of matter that includes at least two distinct phases, wherein a first phase is distributed in a second phase, with the second phase being a continuous medium. Preferably, the dispersion comprises a solid phase which is dispersed as solid particles in a continuous liquid phase.

The term "aqueous polymer dispersion" refers to a polymer dispersion having water as the main carrier. Preferably, the "aqueous" refers to a 100% water carrier. Compounds denoted as PIB, ALK, or PL, or common additives known to the skilled person in the field of aqueous polymer dispersions, in this document are not considered carriers in this perspective.

Preferably, the dispersion adhesive composition comprises less than 5% by weight, preferably less than 1% by weight, based on the total weight of the dispersion adhesive composition, of volatile organic compounds having a boiling point of less than 150° C.

The aqueous polymer dispersion comprises of one or more water-dispersible polymers, preferably free-radically polymerized polymer(s) obtained from ethylenically unsaturated monomers. Preferably, the such polymers contain principal monomers selected from the group consisting of $C_1$-$C_{20}$-alkyl (meth)acrylates, vinyl esters of carboxylic acids containing up to 20 carbon atoms, vinyl aromatic compounds containing up to 20 carbon atoms, ethylenically unsaturated nitriles, vinyl halides, non-aromatic hydrocarbons having at least two conjugated double bonds, or mixtures of these monomers. The acrylic emulsion copolymer binder is an aqueous emulsion polymer prepared by the addition polymerization of at least one ethylenically unsaturated monomer, wherein the binder composition contains greater than 50% by weight of acrylic monomers. Acrylic monomers are defined herein as including (meth)acrylic acid, esters of (meth)acrylic acid, amides of (meth)acrylic acid, and nitriles of (meth)acrylic acid. As an ethylenically unsaturated monomer, acrylic ester monomers including methyl acrylate, ethyl acrylate, butyl acrylate, 2-ethylhexyl acrylate, decyl acrylate, methyl methacrylate, butyl methacrylate, isodecyl methacrylate, hydroxyethyl acrylate, hydroxyethyl methacrylate, and hydroxypropyl methacrylate; acrylamide or substituted acrylamides; styrene or substituted styrenes; butadiene; vinyl acetate or other vinyl esters; acrylonitrile or methacrylonitrile; may be used, subject to the glass-transition temperature ($T_g$) restrictions stated herein. Silicon-containing monomers such as, for example, vinyl trialkoxysilanes including vinyl trimethoxysilane, allyl trialkoxysilanes including allyl trimethoxysilane, (meth)acryloxyalkyl trialkoxysilanes including methacryloxypropyl trimethoxysilane, (meth)acryloxyalkyl alkyldialkoxysilanes including methacryloxypropyl methyldiethoxysilane, (meth)acryloxyalkoxyalkyl trialkoxy silanes including methacryloxyethoxyethyl trimethoxysilane, and mercaptoalkyl trialkoxysilanes including mercaptopropyl trimethoxysilane may also be incorporated at a level of from 0.01% to 6%, by weight based on the weight of the acrylic emulsion copolymer. Low levels of ethylenically-unsaturated monocarboxylic acids such as, for example, from 0 to 7%, by weight, based on the weight of the acrylic emulsion copolymer, methacrylic acid or acrylic acid may be used.

Suitable polymers P include, for example, polyvinyl acetate, polyvinyl alcohol, polyacrylates, polyurethanes, polyurethane-acrylates, natural based polymers, carboxylated polystyrene-copolymers, carboxylated butadiene styrene copolymers, carboxylated butadiene rubbers styrene-butadiene copolymers, styrene-isoprene copolymers, ethylene-vinyl acetate copolymers (EVA), ethylene-methacrylate copolymers, ethylene-ethyl acrylate copolymers, ethylene-butyl acrylate copolymers (EBA), ethylene-(meth) acrylic acid copolymers, ethylene-2-ethylhexyl acrylate copolymers, ethylene-acrylic ester copolymers, and polyolefinc block copolymers.

The above-mentioned copolymers, meaning polymers made from more than one type of monomer, can be block type copolymers or random copolymers. Polymers P can also be further functionalized, meaning they can contain further functional groups such as hydroxyl, carboxy, anhydride, acrylate, and/or glycidylmethacrylate groups.

Preferably, the water-dispersible polymer P contains monomers mentioned further above and mixtures thereof in an amount of 60-100%, more preferably 85-100%, most preferably 95-99.8%, based on the weight of the polymer. Preferred $C_1$-$C_{20}$-alkyl (meth)acrylates include (meth) acrylic acid alkyl esters having a $C_1$-$C_{12}$ alkyl radical, such as methyl (meth)acrylate, n-butyl acrylate, ethyl acrylate, and 2-ethylhexyl acrylate. Polymers obtained by polymerization of mixtures of acrylic acid alkyl esters and (meth) acrylic acid alkyl esters can be mentioned as particularly suitable polymers.

Suitable vinyl esters of carboxylic acids containing up to 20 carbon atoms include, for example, vinyl laurate, vinyl stearate, vinyl propionate, vinyl esters of tertiary saturated monocarboxylic acids, vinyl acetate, and mixtures of two or more thereof.

Suitable vinyl aromatic compounds include, for example, vinyltoluene, α- and p-methylstyrene, α-butylstyrene, 4-n-butylstyrene, 4-n-decylstyrene and styrene. Acrylonitrile and methacrylonitrile are presented as examples of suitable nitriles.

Suitable vinyl halides include, for example ethylenically unsaturated compounds substituted by chlorine, fluorine or bromine, such as vinyl chloride or vinylidene chloride, and mixtures thereof.

For the preparation of suitable water-dispersible polymers P there are furthermore suitable non-aromatic hydrocarbons containing from 2 to 8 carbon atoms and at least two olefinic double bonds, such as butadiene, isoprene and chloroprene.

Further monomers that may be present in the water-dispersible polymer in an amount of 0-40% by weight, preferably from 0-20% by weight and most preferably 0.2-10% by weight, are especially $C_1$-$C_{10}$-hydroxyalkyl (meth)acrylates, (meth)acrylamides and derivatives thereof substituted on the nitrogen by $C_1$-$C_4$-alkyl, ethylenically unsaturated carboxylic acids, dicarboxylic acids, their semi-esters and anhydrides, for example (meth)acrylic acid, maleic acid, fumaric acid, maleic acid anhydride, maleic acid and fumaric acid semi-esters and itaconic acid.

Preferably, the at least one water-dispersible polymer P has a glass transition temperature ($T_g$), determined with DSC according to ISO 11357 standard, of −60-+10° C., more preferably of −60-0° C., most preferably −50--10° C.

The at least one water-dispersible polymer P has in particular a glass transition temperature $T_g$, determined with DSC according to ISO 11357 standard, of <0° C., preferably <−10° C., more preferably <−20° C., most preferably <−30° C.

The term "glass transition temperature" refers to the temperature measured by differential scanning calorimetry (DSC) according to the ISO 11357 standard above which temperature a polymer component becomes soft and pliable, and below which it becomes hard and glassy. The measurements can be performed with a Mettler Toledo 822e device at a heating rate of 2° C./min. The $T_g$ values can be determined from the measured DSC curve with the help of the DSC software.

Suitable water-dispersible polymers P have a number average molecular weight ($M_n$) in the range of 5,000-200,000 g/mol, preferably 25,000-200,000 g/mol, most preferably 50,000-200,000 g/mol. Suitable water-dispersible polymers P have a weight average molecular weight ($M_w$) in the range of 50,000-800,000 g/mol, preferably 100,000-800,000 g/mol, most preferably 150,000-800,000 g/mol.

Preferably, the at least one water-dispersible polymer P has a number average molecular weight ($M_n$) of not more than 200,000 g/mol and a weight average molecular weight ($M_w$) of at least 100,000 g/mol.

The number average and weight average molecular weights can be determined by gel permeation chromatography using polystyrene as standard in a polymer solution in tetrahydrofuran.

The water-dispersible polymers/copolymers can be prepared by free-radical polymerization using substance, solution, suspension or emulsion polymerization techniques, which are known to the person skilled in the art. Preferably, the polymer is obtained by solution polymerization with subsequent dispersion in water or, especially, by emulsion polymerization, so that aqueous polymer dispersions are obtained.

According to one or more embodiments of the present invention, the aqueous polymer dispersion comprises one or more polyacrylate polymers. Preferably, the aqueous polymer dispersion is an aqueous polyacrylate dispersion, in which the amount of the other polymers than polyacrylates is less than 5.0% by weight, preferably less than 2.5% by weight, most preferably less than 1.0% by weight, based on the total weight of the aqueous polymer dispersion.

Suitable polyacrylate dispersions and preparation method thereof are described, for example in EP 0490191 A2, DE 19801892 A1, and in EP 0620243.

Suitable polyacrylate polymers consist for the most part of (meth)acrylates of alcohols containing from 1 to 24 carbon atoms ((meth)acrylic acid ester monomers). There are preferably more than 25% by weight of these basic monomer building blocks in the polyacrylate polymers. Further monomer building blocks include, for example, vinyl esters and allyl esters of carboxylic acids containing from 1 to 20 carbon atoms, vinyl ethers of alcohols containing from 1 to 8 carbon atoms, vinyl aromatic compounds, vinyl halides, non-aromatic hydrocarbons containing from 2 to 8 carbon atoms and at least one olefinic double bond, α and β-unsaturated mono- or di-carboxylic acids containing from 3 to 6 carbon atoms, and derivatives thereof (especially amides, esters and salts). The proportions by weight of the monomer building blocks are so selected that the polyacrylate polymer has a glass transition temperature of −60-+10° C., preferably of −60-0° C., most preferably of −50--10° C.

Preferably, the at least one polyacrylate polymer has a number average molecular weight ($M_n$) in the range of 5,000-200,000 g/mol, preferably 25,000-200,000 g/mol, most preferably 50,000-200,000 g/mol and/or a weight average molecular weight ($M_w$) in the range of 50,000-800,000 g/mol, preferably 100,000-800,000 g/mol, most preferably 150,000-800,000 g/mol. Suitable commercially available aqueous polyacrylate dispersions include Arconal® S 410, Arconal® V 278, Arconal® DS 5017 Arconal® 290 D, Arconal® A323, Arconal® A378, Arconal® 380, Arconal® S 559, Arconal® S 790, Arconal® 5047 (from BASF), Airflex® EAF 60, and Airflex® EAF 67 (from APP), Mowilith® DM 1340 (from Celanese), Primal® CA 162, Primal® E-3362, Primal® 2620, Primal® 928ER, Primal® CA 172, Rhoplex® 4400, and Rhoplex® A920 (from Dow Chemical), Plextol® D 310 (from Synthomer), Vinnapas® EP17 and Vinnapas® EAF68 (from Wacker).

The aqueous polymer dispersion can comprise two or more different polyacrylate polymers having different glass transition temperatures and different monomer compositions. Aqueous polymer dispersions comprising two or more different polyacrylated polymers can be prepared by mixing commercially available polyacrylate dispersions, such as those described above.

In preferred embodiments of the invention, said at least one water-dispersible polymer P is selected from poly(meth)acrylate polymers, styrene-(meth)acrylate copolymers, and vinyl-acetate-(meth)acrylate copolymers.

In the same or other preferred embodiments of the invention, the amount of said at least one water-dispersible polymer P comprised in the composition is at least 18 wt.-%, preferably at least 21 wt.-%, more preferably at least 24 wt.-%, most preferably at least 27 wt.-%, based on the total weight of the sealant after drying in air during 7 days at 40° C.

The water-based dispersion sealant composition comprises furthermore at least one polyolefin oligomer PIB. The at least one polyolefin oligomer PIB should be liquid at 23° C. and under standard pressure.

The term "liquid" means herein that the described substance is a nearly incompressible fluid that conforms to the shape of its container but retains a (nearly) constant volume independent of pressure.

Preferably, the number average molecular weight $M_n$ of the at least one polyolefin oligomer PIB, measured by gel-permeation chromatography using polystyrene as standard, is >1000 g/mol, preferably >1500 g/mol, more preferably >2000 g/mol. The upper limits of the average molecular weight are mainly limited by the viscosity of the liquid, which becomes higher with increasing $M_n$. It has to be ensured that the preparation, workability and application properties, and the final mechanical performance of the water-based dispersion sealant composition according to the present invention are not detrimentally affected by the choice of the at least one polyolefin oligomer PIB. Preferably, the number average molecular weight $M_n$ of the at least one polyolefin oligomer PIB, measured by gel-permeation chromatography using polystyrene as standard, is <10000 g/mol, preferably <5000 g/mol, more preferably <3000 g/mol.

Preferably, the at least one polyolefin oligomer PIB is present in the dispersion sealant composition in a total amount of 1.0-15.0% by weight, preferably 2.0-10.0% by weight, most preferably 3.0-5.0% by weight, based on the total weight of the dispersion sealant composition.

All polyolefin oligomers that are liquid at the conditions specified above are suitable for the purpose of the invention. The term "polyolefin" does encompass all polymers obtained from the polymerization of olefinic monomers, such as 1-ethylene, propylene, 1-butene, 2-butene, isobutylene, and higher olefins, and mixtures thereof. Preferred monomers include C4 unsaturated monomers such as 1-butylene and isobutylene, which may be employed as a mixture.

In preferred embodiments, the at least one polyolefin oligomer PIB comprises or consists of polybutene oligomers and/or polyisobutylene oligomers. Most preferred are polyisobutylene oligomers.

Suitable and preferred polyisobutylene oligomers for use as polyolefin oligomers PIB include Glissopal® V 190, Glissopal® V 230, Glissopal® V 500, Glissopal® V 640, Glissopal® V 700, and Glissopal® V 1500 (BASF) and Indopol® L-8, Indopol® H-100, and Indopol® H-2100 (INEOS) and Polybut® 150 (KEMAT).

The water-based dispersion sealant composition comprises furthermore at least one hydrogenated mixture ALK of alkanes, isoalkanes, and/or cycloalkanes with a boiling point of at least 150° C. The at least one hydrogenated mixture ALK of alkanes, isoalkanes, and/or cycloalkanes with a boiling point of at least 150° C. should be liquid at 23° C. and under standard pressure.

The term "liquid" means herein that the described substance is a nearly incompressible fluid that conforms to the shape of its container but retains a (nearly) constant volume independent of pressure.

Preferably, the boiling point of the at least one hydrogenated mixture ALK of alkanes, isoalkanes, and/or cycloalkanes is >200° C., preferably >250° C., more preferably >300° C., most preferably >350° C.

The at least one hydrogenated mixture ALK of alkanes, isoalkanes, and/or cycloalkanes preferably comprises alkanes, isoalkanes, and/or cycloalkanes based on C10-C30 fractions, preferably C12-C25 fractions, more preferably C13-C23 fractions.

The at least one hydrogenated mixture ALK of alkanes, isoalkanes, and/or cycloalkanes preferably comprises aromatics (hydrocarbons with aromatic moieties) such as substituted or non-substituted benzene and substituted or non-substituted naphthalene with an amount of <1 wt.-%, preferably <0.5 wt.-%, more preferably <0.1 wt.-%.

Suitable as at least one hydrogenated mixture ALK of alkanes, isoalkanes, and/or cycloalkanes are for example Hydroseal® G 400 H, Hydroseal® G 280 H, Hydroseal® G 3H (TOTAL).

Preferably, the at least one hydrogenated mixture ALK of alkanes, isoalkanes, and/or cycloalkanes is present in the dispersion sealant composition in a total amount of 1.0-10.0% by weight, preferably 1.5-5.0% by weight, most preferably 2.0-4.0% by weight, based on the total weight of the dispersion sealant composition.

The inventive water-based dispersion sealant composition preferably comprises at least one filler.

A filler influences the rheological properties of the uncured composition and also the mechanical properties and the surface nature of the fully cured composition. Suitable fillers are inorganic and organic fillers, as for example natural, ground or precipitated chalks (which consist entirely or primarily of calcium carbonate), and which are optionally coated with fatty acids, more particularly stearic acid; barium sulfate ($BaSO_4$, also called barite or heavy spar), calcined kaolins, aluminum oxides, aluminum hydroxides, silicas, especially finely divided silicas from pyrolysis processes, carbon blacks, especially industrially manufactured carbon black, titanium dioxide, PVC powders, or hollow beads. Preferred fillers are calcium carbonates, calcined kaolins, carbon black, finely divided silicas, and flame-retardant fillers, such as hydroxides or hydrates, especially hydroxides or hydrates of aluminum, preferably aluminum hydroxide.

It is entirely possible and may even be an advantage to use a mixture of different fillers.

Very preferred as filler for the composition of the invention is chalk (calcium carbonate). Especially preferred is uncoated chalk, most preferably uncoated, ground chalk, as available for example under the name Omyacarb® 40 GU (Omya AG, Switzerland).

The type and amount of filler is not particularly limited in the present invention. Examples of suitable fillers include calcium carbonate, calcium sulfate and calcium containing minerals such as limestone, calcite, chalk, dolomite, wollastonite, gypsum, apatite, phosphate rock, and mixtures thereof.

The term "filler" refers in the present disclosure to solid particulate materials, which are commonly used as fillers in water-based dispersion sealant compositions and which have low water-solubility. Preferably, the filler has a water-solubility of less than 0.1 g/100 g water, more preferably less than 0.05 g/100 g water, most preferably less than 0.01 g/100 g water, at a temperature of 20° C.

Preferably, the filler has a median particle size $d_{50}$ in the range of 1.0-100.0 μm, more preferably of 1.0-60.0 μm, most preferably 2.0-50.0 μm. The term "median particle size $d_{50}$" refers in the present disclosure to a particle size below which 50% of all particles by volume are smaller than the $d_{50}$ value.

The term "particle size" refers to the area-equivalent spherical diameter of a particle. The particle size distribution can be measured by laser diffraction according to the method as described in standard ISO 13320:2009. A Mastersizer 2000 device (trademark of Malvern Instruments Ltd, GB) can be used in measuring particle size distribution.

Preferably, the one or more fillers are present in the dispersion sealant composition in a total amount of 10.0-60.0% by weight, preferably 15.0-50.0% by weight, most preferably 20.0-45.0% by weight, based on the total weight of the dispersion sealant composition.

In preferred embodiments, the sealant composition according to the present invention comprises at least one filler selected from calcium carbonate and/or titanium dioxide.

According to one or more embodiments, where the intended use of the dispersion sealant compositions is a coating, the water content of the dispersion sealant composition is 10.0-70.0% by volume, preferably 25.0-60.0% by volume, most preferably 35.0-50.0% by volume, based on the total volume of the dispersion sealant composition.

According to one or more embodiments, where the intended use of the dispersion sealant compositions is joint sealant or adhesive, the water content of the dispersion sealant composition is 15.0-45.0% by volume, preferably 20.0-35.0% by volume, most preferably 24.0-30.0% by volume, based on the total volume of the dispersion sealant composition.

According to one or more embodiments, the amount of aqueous polymer dispersion is 10.0-70.0% by weight, preferably 20.0-60.0% by weight, most preferably 25.0-40.0% by weight, based on the total weight of the dispersion sealant composition.

According to one or more embodiments, the dispersion sealant composition has a solids content of 40-90% by weight, preferably 50-88% by weight, most preferably 65-85% by weight.

The solids content as used herein refers to the portion of the aqueous dispersion adhesive composition, which when heated to a temperature of 105° C. for one hour at one atmosphere pressure does not volatilize. Accordingly, the solids content refers to polymeric materials, non-volatile plasticizers, inorganic solids and non-volatile organic materials, whereas the non-solid portion is generally comprised of water and any organic materials readily volatilized at 105° C.

According to one or more embodiments, the aqueous polymer dispersion has a solids content of 40-80% by weight, preferably 50-75% by weight, most preferably 55-70% by weight.

According to one or more embodiments, the weight ratio of water to polymer P in the dispersion sealant composition is between of 3:2 and 1:4, preferably between 1:1 and 1:3, most preferably between 9:11 and 3:7.

According to one or more embodiments, the water-dispersible polymers P are present in the dispersion sealant composition in a total amount of 5.0-65.0% by weight, preferably 10.0-55.0% by weight, most preferably 15.0-45.0% by weight, based on the total weight of the dispersion sealant composition.

The dispersion sealant composition further optionally contains one or more plasticizers PL having at least one ester or ether group. The use of a plasticizer depends on the intended application and the polymer P used. Very soft polymers P with a very low $T_g$, such as for example −60° C., do not necessarily require the addition of a plasticizer PL. Furthermore, if the dispersion sealant composition is intended to be used as an elastic adhesive, plasticizer PL may also be minimized or omitted in the composition. For uses where a soft joint sealant (with low Shore A hardness) or a coating is required, and/or when using a polymer P with a higher $T_g$, such as for example −10° C., the use of a plasticizer PL is recommended.

Suitable plasticizers PL are liquid or solid inert organic substances having a low vapor pressure, preferably having a boiling point of above 200° C. measured at standard pressure. Plasticizers can be selected from the group consisting of adipic and sebacic acid plasticizers, phosphoric acid plasticizers, citric acid plasticizers, fatty acid esters and epoxidised fatty acid esters, polypropylene glycol, polyethylene glycol, benzoates, and phthalates or esters of 1,2-dicarboxy cyclohexane.

Suitable fatty acid esters include alkyl esters of fatty acids containing more than 14 or more than 16 carbon atoms, for example the alkyl esters of lauric, myristic, stearic, arachidic and behenic acid and mixtures thereof. Suitable as fatty alcohols are the alcohols of the above-mentioned fatty acids, such as are obtainable from the fatty acids or esters thereof by use of processes known to the person skilled in the art.

The one or more plasticizers PL having at least one ester or ether group can be present if at all in the dispersion sealant composition with a total amount of 0.5-30.0% by weight, for example 1.0-20% by weight, in particular 2.5-15.0% by weight, based on the total weight of the dispersion sealant composition.

In preferred embodiments of the dispersion sealant composition according to the present invention, the plasticizer PL having at least one ester or ether group is selected from phthalate esters, cyclohexane esters, or benzoate esters.

The dispersion sealant composition according to the present invention is preferably formulated such that the weight ratio (PIB+ALK):PL in the composition before drying of the combined amounts of polyolefin oligomer PIB and hydrogenated mixture ALK to plasticizer PL is between 0.25 and 5, preferably between 0.5 and 2, more preferably between 0.75 and 1.5.

The dispersion sealant composition can further comprise one or more tackifiers. Examples of suitable tackifiers may include hydrocarbon resins or hydrogenated products thereof, rosins or hydrogenated products thereof, rosin esters or hydrogenated products thereof, terpene resins or hydrogenated products thereof, terpene phenolic resins or hydrogenated products thereof, and polymerized rosins or polymerized rosin esters or acrylic liquid resins.

The dispersion sealant composition can also contain one or more further additives such as wetting agents, dispersion agents (dispersants), surfactants, emulgators, thickeners, anti-foams, flame retardants, stabilizers, colorants, antioxidants, UV-absorbers and/or biocides. Such further additives commonly used in water-based dispersion additives are known to a person skilled in the art.

Suitable anti-foams are preferably compounds based on mineral oils or silicones. Suitable thickeners include compounds that are based on (meth)acrylic acid copolymers, cellulose derivatives, mineral thickeners such as clays, silica, or mixtures thereof.

Biocides (preservatives) may be added to the sealant compositions according to the present invention in an amount of between 0 wt % and 2 wt %, preferably between 0.2 wt % and 1.8 wt %, more preferably between 0.4 wt % and 1.5 wt %, with respect to the total composition, of a biocide.

In general any known type of biocides, also denoted as preservatives, can be used in the composition of the present invention.

Suitable as preservatives are customary preservatives, for example benzisothiazolinone (BIT), methylisothiazolinone (MIT), octylisothiazolinone (OIT), and chloromethyl isothiazolinone (CMIT).

Surfactants are furthermore useful and preferred for the compositions according to the present invention. Suitable surfactants include anionic, non-ionic, cationic or amphoteric surfactants, but preferably a non-ionic or anionic surfactant is employed. Generally the amount of surfactant employed will range from 0.1 to 5% by weight, based on the total weight of the sealant composition. Suitable non-ionic surfactants include polyethylene oxide condensates of alkylphenols, polyoxyalkylene derivatives of propylene glycol, condensates of ethylene oxide and the reaction product of propylene oxide and ethylene diamine, ethylene oxide condensates of aliphatic alcohols, long chain tertiary amine oxides, long chain tertiary phosphine oxides, and long chain dialkyl sulfoxides. Useful anionic surfactants include those obtained by alkylating aromatic nuclei, sulfonating the resulting alkylated aromatic hydrocarbons and neutralizing the sulfonation products. Alkyl benzene sulfonates, such as dodecylbenzenesulfonate are typical of this class. Fatty alcohol sulfates are also useful as surface active agents.

According to one or more embodiments, the total amount of the further additives is preferably 0-15.0% by weight, more preferably 0-10.0% by weight, based on the total weight of the dispersion sealant composition.

The dispersion sealant composition can be prepared by mixing the ingredients together at room temperature. Any suitable mixing apparatus can be used for the preparation of the adhesive composition.

The dispersion sealant composition is especially suitable for sealing joints in or coating substrates of wood, plastic, such as PVC, or metal, mineral substrates such as plaster flooring, natural stone, concrete, cementitious levelling compounds or gypsum-based levelling compounds.

The dispersion sealant composition according to the present invention has preferably a tackiness, after drying in air during 28d at 23° C. with a relative humidity of 50%, of 0 (zero) grams, as defined by the amount of quartz sand (0.7 mm-1.2 mm particle size) that is poured on the surface of a test specimen in the form of a disc with a diameter of 4.2 mm and a height of 5 mm and dried in air at 23° C. and 50% r.h., when the test specimen is turned around 180° after addition of the sand, the sand-covered side facing downwards, and the amount of sand still adhering to the surface is used to determine said tackiness.

The dispersion sealant composition according to the present invention has preferably a Shore A hardness after drying in air during 28d at 23° C. with a relative humidity of 50% of between 5 and 25, preferably between 5 and 20, more preferably between 5 and 15, most preferably between 5 and 10. The Shore A hardness is preferably at least 5.

According to another aspect of the present invention, a method for sealing a joint between two substrates and/or coating a surface of a substrate is provided, the method comprising steps of:
  i) Applying the dispersion sealant composition according to the present invention into the joint between two substrates and/or onto a surface of a substrate to form a wet film of sealant thereon,
  ii) Exposing the wet sealant in the filled joint and/or the wet film of sealant on the surface to air until the joint sealant and/or surface film is dry.

According to another aspect of the present invention, a method for adhesively joining two substrates is provided, the method comprising steps of:
  i) Applying the dispersion sealant composition according to the present invention to a first substrate to form a wet film of sealant on the first substrate, or applying the dispersion sealant composition according to the present invention to a first substrate and to a second substrate to form a wet film of sealant on both substrates,
  ii) Exposing the wet film to air,
  iii) Joining a second substrate to the first substrate such that the wet film on the first substrate is in contact with the second substrate, or such that both wet films on both substrates are in contact with each other, to effect bonding there between.

The dispersion sealant composition can be applied on the surface of the substrate using for example, a toothed trowel or a roller.

According to another aspect of the present invention, use of the water-based dispersion sealant composition of the present invention for sealing a joint between two substrates and/or for coating a surface on a substrate is provided.

According to still another aspect of the present invention, use of an additive comprising
a) at least one polyolefin oligomer PIB,
b) at least one hydrogenated mixture ALK of alkanes, isoalkanes, and/or cycloalkanes with a boiling point of at least 150° C.,
for reducing the tackiness of a water-based dispersion sealant composition comprising at least one polymer P and at least one plasticizer PL having at least one ester or ether group,
wherein the at least one polyolefin oligomer PIB and the at least one hydrogenated mixture ALK of alkanes, isoalkanes, and/or cycloalkanes with a boiling point of at least 150° C. are liquid at 23° C., is provided.

Yet another aspect of the present invention is a dried water-based dispersion sealant composition according to the present invention.

Examples

The invention is further explained in the following experimental part which, however, shall not be construed as limiting to the scope of the invention. The proportions and percentages indicated are by weight, unless otherwise stated. Accordingly, "wt.-%" means percentage by weight, based on the weight of the total composition given in the respective case. "RT" means room temperature or ambient temperature and describes a temperature of 23° C. The abbreviation "r.h." or "% r.h." means relative humidity (in %) of the ambient air in a given example or test method.

Test Methods

The maximum stress was determined 23° C. in accordance with DIN EN ISO 8339. Using the same standard DIN EN ISO 8339, elongation at break and adhesion properties (failure mode) on concrete and PCV as substrates were determined.

The tensile strength, the elongation at break, and the modulus of elasticity at 0-100% elongation were determined according to DIN 53504 (tensile speed: 200 mm/min) on films with a layer thickness of 2 mm, cured for 14 days at 23° C. and 50% relative humidity.

The tear propagation resistance was determined according to DIN 53515, on films with a layer thickness of 2 mm, cured for 7 days at 23° C. and 50% relative humidity.

The tackiness was determined at 23° C. and 50% relative humidity after 1 day, 7 days, and 28 days after preparation of the sample. For the determination of the tackiness, test specimen was made with fresh sealant in the form of a disc with a diameter of 4.2 mm and a height of 5 mm using a PTFE ring positioned on a cardboard sheet. After the above specified waiting time, quartz sand (0.7 mm-1.2 mm particle size) was poured onto the surface. Then, the disc was turned around 180°, the sand-covered side facing downwards. The amount of sand still adhering to the surface was determined by weighing on a laboratory balance. Surface tackiness was quantified by the amount of sand (in g) still adhering to the surface.

The Shore A hardness was determined according to DIN 53505 on samples with a layer thickness of 6 mm, cured for 7 days, 14 days, and 28 days at 23° C. (RT) and 50% relative humidity, or for 7 days at 40° C. Furthermore, several samples were measured after curing for 7 days at 40° C., followed by immersion in water for 7 days. The water uptake (in wt.-%) was determined by a laboratory balance before and after water immersion with these samples.

Raw Materials

The raw materials and their description regarding important properties which were used for the example sealant compositions are shown in Table 1.

TABLE 1

Raw materials used for the example compositions.

| Raw material | Description |
| --- | --- |
| Acronal V278 | Aqueous acrylate dispersion. 64-66% solids, $T_g = -40°$ C. |
| Anionic surfactant | Fatty alcohol polyglycol ether sulphate |
| Dispersant | Polycarboxylate ammonium salt |
| DINP | Diisononylphthalate (plasticizer) |
| Benzoflex | Dipropylene glycol dibenzoate (plasticizer) |
| Hydroseal G400 H | Hydrogenated mixture of C13-C23 n-alkanes, isoalkanes, cycloalkanes, <0.03% aromatics |
| Glissopal V1500 | Polyisobutylene oligomer. Mn = 2300 g/mol (GPC) |
| CaCO$_3$ | Ground natural calcium carbonate (filler); median particle size ($d_{50}$): 5 µm |
| Dolomite | Ground natural dolomite (filler); median particle size ($d_{50}$): 5.5 µm |
| TiO$_2$ | Titanium dioxide (filler, brightener) |
| Acrylic thickener | Acrylic dispersion. 30% solids. |
| Cellulose thickener | Cellulose ether thickener |
| Silicone emulsion | Emulsion of polydimethylsiloxane (40 wt.-%) in water |

Example Compositions

Several inventive and non-inventive (reference) compositions were prepared from the raw materials in Table 1 using the following procedure.

Mixing Procedure

All example compositions were prepared in a lab mixer using the following procedure:
  a) Adjustment of the Acronal V278 acrylic dispersion to pH 8 by using caustic soda (25 wt.-% NaOH in water).
  b) Addition of the liquid raw materials except the acrylic thickener.
  c) Addition of the powder raw materials in several steps, each interrupted by stirring. After addition of all powders, dispersing of the powders during 10 min.
  d) Addition of the acrylate thickener.
  e) Mixing under vacuum and filling of the preparations into cartridges.
  f) Storing the cartridges for at least 24 h at 23° C. and 50% r.h. prior to initiating the testing procedure.

Details of the Example Compositions

Several non-inventive reference (denoted "R") and inventive (denoted "I") example compositions were made from the raw materials in Table 1 according to the mixing procedure detailed above. The compositions and the relative amounts (in wt-%) of the raw materials are shown in Tables 2 and 3.

TABLE 2

Example compositions.

| Ingredient (wt.-%) | R1 | R2 | R3 | R4 | R5 | R6 | I1 |
| --- | --- | --- | --- | --- | --- | --- | --- |
| Acronal V278 (pH 8 *) | 36.9 | 36.9 | 36.9 | 36.9 | 36.9 | 36.9 | 36.9 |
| Anionic surfactant | 0.5 | 0.5 | 0.5 | 0.5 | 0.5 | 0.5 | 0.5 |
| Dispersant | 0.5 | 0.5 | 0.5 | 0.5 | 0.5 | 0.5 | 0.5 |
| DINP | 11.9 | 10.6 | 9.4 | 6.9 | 7.9 | 5.9 | 3.4 |
| Hydroseal G400 H | — | 1.3 | 2.5 | 5 | — | — | 2.5 |
| Glissopal V1500 | — | — | — | — | 4 | 6 | 6 |
| CaCO$_3$ | 48 | 48 | 48 | 48 | 48 | 48 | 48 |
| TiO$_2$ | 2 | 2 | 2 | 2 | 2 | 2 | 2 |
| Acrylic thickener | 0.2 | 0.2 | 0.2 | 0.2 | 0.2 | 0.2 | 0.2 |

* adjusted to pH 8 by NaOH (25 wt.-% in water)

TABLE 3

Example compositions.

| Ingredient (wt.-%) | I2 | I3 | R7 | R8 | R9 | R10 | R11 |
| --- | --- | --- | --- | --- | --- | --- | --- |
| Acronal V278 (pH 8 *) | 37.2 | 37.5 | 37.4 | 37.2 | 37.0 | 37.2 | 37.7 |
| Anionic surfactant | 0.6 | 0.5 | 0.6 | 0.6 | 0.6 | 0.6 | 0.6 |
| Dispersant | 0.6 | 0.4 | 0.6 | 0.6 | 0.6 | 0.6 | 0.6 |
| DINP | 6.6 | — | — | 10.7 | 9.1 | 5.5 | — |
| Benzoflex | — | — | 10.4 | — | — | 5.1 | 10.1 |
| Hydroseal G400 H | 3 | 6 | — | — | — | — | — |
| Glissopal V1500 | 3 | 6 | — | — | — | — | — |
| CaCO$_3$ | — | — | — | — | 47.7 | 48.0 | 48.0 |
| Dolomite | 47 | 47 | 47.9 | 48.1 | — | — | — |
| TiO$_2$ | 2 | 2 | 2 | 2 | 2 | 2 | 2 |
| Acrylic thickener | — | 0.3 | 1.1 | 0.8 | 1 | 1 | 1 |
| Cellulose thickener | — | 0.5 | — | — | — | — | — |
| Silicone Emulsion | — | — | — | — | 2 | — | — |

* adjusted to pH 8 by NaOH (25 wt.-% in water)

Test Results

The results of the test methods used on each example composition are detailed in Tables 4 to 7.

TABLE 4

Test results (tackiness, water uptake, and Shore A hardness)

| Test method conditions [unit] | R1 | R2 | R3 | R4 | R5 | R6 | I1 |
| --- | --- | --- | --- | --- | --- | --- | --- |
| Tackiness 1 d [g] | 1.41 | 1.40 | 1.43 | 1.38 | 1.42 | 1.39 | 1.31 |
| Tackiness 7 d [g] | 1.40 | 1.48 | 1.40 | 0.48 | 1.27 | 1.34 | 0.27 |
| Tackiness 28 d [g] | 0.29 | 0.33 | 0.06 | 0.08 | 0.07 | 0.03 | 0 |
| Shore A 7 d RT | <5 | <5 | <5 | <5 | <5 | 5 | 6 |
| Shore A 14 d RT | 6 | <5 | <5 | <5 | 6 | 6 | 7 |
| Shore A 28 d RT | 8 | 6 | 5 | 5 | 8 | 9 | 10 |
| Shore A 7 d 40° C. | 14 | 13 | 11 | 12 | 15 | 15 | 14 |
| Shore A 7 d 40° C. + 7 d H$_2$O | <5 | <5 | <5 | <5 | <5 | <5 | 5 |
| H$_2$O uptake 7 d H$_2$O [wt.-%] | 6.19 | 6.06 | 5.49 | 5.49 | 5.45 | 5.61 | 4.92 |

The results of Table 4 show that the inventive sealant composition I1 shows a significantly lower surface tackiness after 7 days compared to the reference compositions R1-R6. After 28 days, the surface tackiness of the inventive composition is reduced to zero, while the reference examples all still show a remaining tackiness. Also water uptake is considerably lower in the inventive example compared to the reference examples.

TABLE 5

Test results (tackiness, water uptake, and Shore A hardness)

| Test method conditions [unit] | I2 | I3 | R7 | R8 | R9 | R10 | R11 |
| --- | --- | --- | --- | --- | --- | --- | --- |
| Tackiness 1 d [g] | 1.15 | 0.09 | 1.4 | 1.4 | 1.26 | 1.38 | 1.34 |
| Tackiness 7 d [g] | 0.4 | 0.04 | 1.35 | 1.18 | 0.25 | 0.109 | 1.08 |
| Tackiness 28 d [g] | 0 | 0 | 0.87 | 0.55 | 0 | 1.19 | 0.96 |
| Shore A 7 d RT | <5 | 9 | <5 | <5 | 8 | <5 | 5 |
| Shore A14 d RT | <5 | 10 | <5 | <5 | 11 | 6 | 7 |

TABLE 5-continued

Test results (tackiness, water uptake, and Shore A hardness)

| Test method conditions [unit] | I2 | I3 | R7 | R8 | R9 | R10 | R11 |
|---|---|---|---|---|---|---|---|
| Shore A 28 d RT | 6 | 16 | 7 | 7 | 13 | 7 | 7 |
| Shore A 7 d 40° C. | 20 | 19 | 23 | 22 | 24 | 19 | 19 |
| Shore A 7 d 40° C. + 7 d $H_2O$ | <5 | 7 | <5 | <5 | <5 | <5 | <5 |
| $H_2O$ uptake 7 d $H_2O$ [wt.-%] | 7.8 | 5.4 | 12.4 | 10.7 | 19 | 29.7 | 7.0 |

The results of Table 5 show that the inventive sealant compositions 12 and 13 shows a significantly lower surface tackiness after 7 days compared to the reference compositions R7-R11. After 28 days, the surface tackiness of the inventive compositions is reduced to zero, while the reference examples all still show a remaining tackiness, except for R9, which contains a silicone-based tack modifier. Also water uptake is considerably lower in the inventive examples compared to most reference examples.

TABLE 6

Test results (mechanical tests and adhesion)

| Test method conditions [unit] | R1 | R2 | R3 | R4 | R5 | R6 | I1 |
|---|---|---|---|---|---|---|---|
| Tensile strength DIN 53504 [MPa] | 0.283 | 0.302 | 0.223 | 0.224 | 0.217 | 0.291 | 0.340 |
| Elongation at break DIN 53504 [%] | 266.8 | 349.1 | 324.2 | 329.5 | 353.7 | 424.5 | 513.5 |
| 50% modulus DIN 53504 [MPa] | 0.175 | 0.172 | 0.121 | 0.119 | 0.146 | 0.149 | 0.184 |
| Tear propagation resistance DIN 53504 [MPa] | 2.64 | 2.71 | 2.54 | 2.59 | 3.00 | 3.15 | 3.39 |
| Maximum stress ISO 8339 (concrete) [MPa] | 0.076 | 0.070 | 0.064 | 0.063 | 0.077 | 0.078 | 0.082 |
| Elongation at break ISO 8339 (concrete) [%] | 304 | 354 | 360 | 361 | 351 | 385 | 362 |
| Failure mode ISO 8339 (concrete) [% cohesive failure] | 100 | 100 | 100 | 100 | 100 | 100 | 100 |
| Maximum stress ISO 8339 (PVC) [MPa] | 0.035 | 0.034 | 0.026 | 0.034 | 0.048 | 0.057 | 0.068 |
| Elongation at break ISO 8339 (PVC) [%] | 71 | 83 | 97 | 75 | 130 | 166 | 232 |
| Failure mode ISO 8339 (PVC) [% cohesive failure] | 0 | 0 | 0 | 0 | 0 | 0 | 0 |

Table 6 shows that the inventive sample I1 has a higher tensile strength and a higher elongation at break compared to the non-inventive reference examples. Furthermore, the inventive example has a significantly higher tear propagation resistance and a higher maximum stress in both DIN EN ISO 8339 tests using concrete and PVC substrates. The failure mode is on the same level for all tested samples shown in Table 6.

TABLE 7

Test results (mechanical tests and adhesion).

| Test method conditions [unit] | I2 | I3 | R7 | R8 | R9 | R10 | R11 |
|---|---|---|---|---|---|---|---|
| Tensile strength DIN 53504 [MPa] | 0.27 | 0.40 | 0.26 | 0.27 | 0.33 | 0.33 | 0.34 |
| Elongation at break DIN 53504 [%] | 314 | 299 | 255 | 219 | 239 | 232 | 311 |

TABLE 7-continued

Test results (mechanical tests and adhesion).

| Test method conditions [unit] | I2 | I3 | R7 | R8 | R9 | R10 | R11 |
|---|---|---|---|---|---|---|---|
| 50% modulus DIN 53504 [MPa] | 0.15 | 0.23 | 0.16 | 0.18 | 0.23 | 0.18 | 0.18 |
| Tear propagation resistance DIN 53504 [MPa] | 2.8 | 3.8 | 2.8 | 2.9 | 3.7 | 3.0 | 3.3 |
| Maximum stress ISO 8339 (concrete) [MPa] | 0.058 | n/m | 0.058 | 0.064 | 0.08 | 0.045 | 0.062 |
| Elongation at break ISO 8339 (concrete) [%] | 420 | n/m | 456 | 413 | 270 | 325 | 272 |
| Failure mode ISO 8339 (concrete) [% cohesive failure] | 100 | n/m | 100 | 100 | 100 | 100 | 100 |
| Maximum stress ISO 8339 (PVC) [MPa] | 0.042 | n/m | 0.031 | 0.034 | 0.06 | n/m | n/m |
| Elongation at break ISO 8339 (PVC) [%] | 160 | n/m | 99 | 108 | 63 | n/m | n/m |
| Failure mode ISO 8339 (PVC) [% cohesive failure] | 0 | n/m | 0 | 0 | 0 | n/m | n/m |

"n/m" means that these values have not been measured.

Table 7 shows that the inventive sample 13 has a higher tensile strength compared to the non-inventive reference examples. Inventive example 12 has a higher elongation at break than the compared reference samples. Furthermore, the inventive example 12 has a significantly better performance in the DIN EN ISO 8339 test using PVC substrates that the compared measured reference samples.

The invention claimed is:

1. A water-based dispersion sealant composition comprising:
   a) an aqueous polymer dispersion comprising water and at least one water-dispersible polymer P,
   b) at least one polyolefin oligomer PIB,
   c) at least one hydrogenated mixture ALK including alkanes, isoalkanes, and/or cycloalkanes with a boiling point of at least 150° C., and
   d) optionally at least one plasticizer PL having at least one ester or ether group,
   wherein
   the at least one polyolefin oligomer PIB and the at least one hydrogenated mixture ALK are liquid at 23° C. and under standard pressure,
   the at least one polyolefin oligomer PIB is selected from polybutene and/or polyisobutylene,
   a number average molecular weight Mn of the at least one polyolefin oligomer PIB, measured by gel-permeation chromatography using polystyrene as standard, is >1000 g/mol, and
   the at least one water-dispersible polymer P is selected from the group consisting of poly(meth)acrylate polymers, styrene-(meth)acrylate copolymers, and vinyl-acetate-(meth)acrylate copolymers.

2. The dispersion sealant composition according to claim 1, wherein the at least one water-dispersible polymer P has a glass transition temperature $T_g$, determined with DSC according to ISO 11357 standard, of <0° C.

3. The dispersion sealant composition according to claim 1, wherein an amount of the at least one water-dispersible polymer P present in the dispersion sealant composition is at least 18 wt %, based on a total weight of the sealant after drying in air during 7 days at 40° C.

4. The dispersion sealant composition according to claim 1, wherein a solids content of the dispersion sealant composition before drying is 40-90% by weight.

5. The dispersion sealant composition according to claim 1, wherein the boiling point of the at least one hydrogenated mixture ALK is >200° C.

6. The dispersion sealant composition according to claim 1, wherein the at least one polyolefin oligomer PIB is present in the dispersion sealant composition in a total amount of 1.0-15.0% by weight based on a total weight of the dispersion sealant composition.

7. The dispersion sealant composition according to claim 1, wherein the at least one hydrogenated mixture ALK is present in the dispersion sealant composition in a total amount of 1.0-10.0% by weight, based on a total weight of the dispersion sealant composition.

8. The dispersion sealant composition according to claim 1, wherein in the dispersion sealant composition before drying, a weight ratio combined amounts of the at least one polyolefin oligomer PIB and the at least one hydrogenated mixture ALK to plasticizer PL the at least one plasticizer PL, (PIB+ALK):PL, is between 0.25 and 5.

9. A method for sealing a joint between two substrates and/or coating a surface of a substrate, the method comprising:
   i) applying the dispersion sealant composition according to claim 1 into the joint between the two substrates and/or onto the surface of the substrate to form a wet film of sealant thereon,
   ii) exposing the wet sealant in the filled joint and/or the wet film of sealant on the surface of the substrate to air until the wet sealant and/or the wet film is dry.

10. A method for adhesively joining two substrates, the method comprising:
   i) applying the dispersion sealant composition according to claim 1 to a first substrate to form a wet film of sealant on the first substrate,
   ii) exposing the wet film to air,
   iii) joining a second substrate and the first substrate such that the wet film on the first substrate is in contact with the second substrate to effect bonding there between therebetween.

11. A method comprising applying the dispersion sealant composition according to claim 1 for sealing a joint between two substrates and/or for coating a surface on a substrate and/or for adhesively joining two substrates together.

12. A dried water-based dispersion sealant composition according to claim 1.

13. A method for adhesively joining two substrates, the method comprising:
   i) applying the dispersion sealant composition according to claim 1 to a first substrate and a second substrate to form a wet film of sealant on both substrates,
   ii) exposing the wet film to air,
   iii) joining the second substrate and the first substrate such that both wet films on both substrates are in contact with each other to effect bonding therebetween.

* * * * *